June 10, 1969 R. L. BAILEY 3,449,584
CONTAMINATED AIR DETECTOR USING RADIANT
ENERGY SENSITIVE MEANS
Filed May 20, 1966
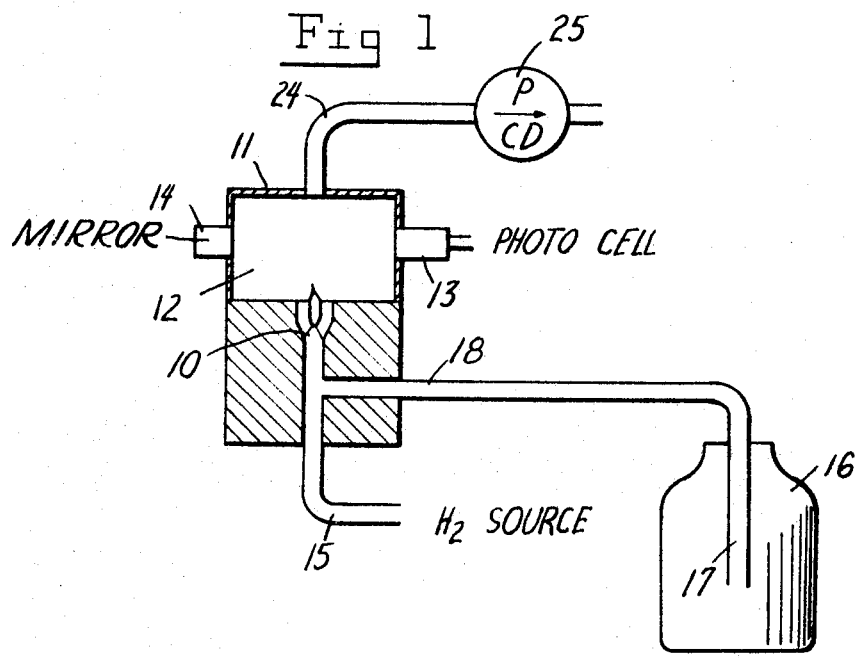
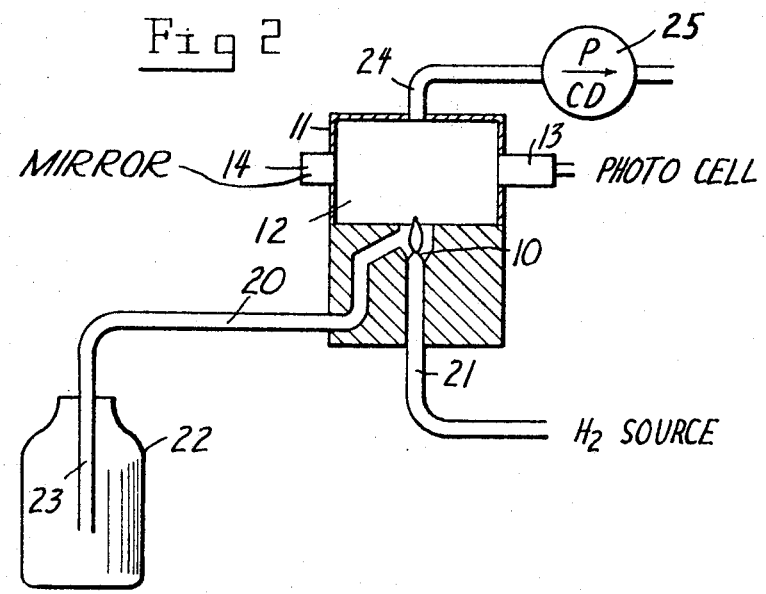
INVENTOR.
ROBERT L. BAILEY United States Patent Office 3,449,584
Patented June 10, 1969

3,449,584
CONTAMINATED AIR DETECTOR USING RADIANT ENERGY SENSITIVE MEANS
Robert L. Bailey, Spokane, Wash., assignor to National Distillers and Chemical Corporation, New York, N.Y., a corporation of Virginia
Filed May 20, 1966, Ser. No. 551,798
Int. Cl. G01n 21/26, 31/12
U.S. Cl. 250—218   6 Claims

ABSTRACT OF THE DISCLOSURE

A production line contaminated air detector capable of detecting contaminants in containers operates on a sample of atmosphere which is withdrawn from a container and introduced into a colorless hydrogen flame. The flame is enclosed in a sealed container with a photocell capable of being activated by coloration of the flame. A vacuum pump is operatively connected to the sealed enclosure to purge the enclosure between successive tests.

---

This invention relates to a novel contaminated air detector or cell, being designed primarily for use in the detection of contaminants in a sample of atmosphere removed from a container, such as a plastic milk bottle or jug.

The apparatus described herein is designed for use as a sensing cell in a device such as is illustrated in my co-pending application for U.S. Patent, Ser. No. 373,310 filed June 8, 1964, for Noxious Odor Detector, now Patent No. 3,266,292 granted Aug. 16, 1966. In general, the device shown in this patent utilizes an ionization cell to detect the presence of contaminant molecules in a sample of atmosphere removed from a bottle, an indexing apparatus for positioning the bottle, a mechanical device for removing a sample of atmosphere from each bottle being tested, an electrical detection system activated by the cell, and a rejection system for handling bottles within which contaminants are located. The present disclosure is concerned only with an alternate form of detection cell, designed for use in the same general combination of mechanical and electrical components described in my U.S. Patent No. 3,266,292.

It is a first object of this invention to provide a simplified sensing cell for a device designed to monitor the presence of contaminants in gas samples, reducing the expense of the cell and the cost of maintaining or repairing the various components thereof.

Another object of this invention is to substitute a photoelectric detection system in a cell for detecting the presence of contaminants in a gaseous flame in place of the ion collector apparatus previously used.

Another object of this invention is to permit alternate paths to be utilized in delivering the sample being tested to the constant gaseous flame used in such a cell.

These and further objects will be evident from the following disclosure, taken together with the accompanying drawings, which illustrate two forms of the apparatus. The schematic illustrations in the drawings are not intended to physically limit the structure described herein and obviously many variations are possible within the scope of the present disclosure.

In the drawings:
FIGURE 1 is a schematic view of a first form of detector according to the present disclosure; and
FIGURE 2 is a similar view of a modified cell.

In my prior application, Ser. No. 373,310 cited above, there is disclosed a complete mechanical apparatus for removing samples of atmosphere from successive containers such as milk bottles or jugs, to check the presence of organic molecules within the containers prior to use thereof. This apparatus indexes each container relative to the testing apparatus, removes a sample of atmosphere from each container, passes the sample through an ionization cell which detects the presence of contaminant molecules by the formation of an ionization current within the cell, and mechanically rejects bottles within which contaminants are found. The apparatus of this invention as shown in the drawings is concerned with an alternate form of the cell, substituting a photo-electric detector in place of the ionization detector circuits.

As shown in the drawings, a small diameter orifice 10 is provided within a sealed enclosure 11. The orifice 10 is open to the sealed interior 12 of the enclosure 11. A photocell 13 and reflective mirror (flat or concave) 14 are mounted within the enclosure 11 directed oppositely across the interior 12 thereof immediately above orifice 10. The photocell 13 is connected to an electrometer (not shown) designed to detect voltages generated by the photocell 13 due to the intensity of light directed thereto. Normally, the voltage generated by the cell 13 will be zero. The orifice 10 is provided with a constant flow of hydrogen gas from a connecting inlet 15 that is in communication with a source of hydrogen gas such as a hydrogen gas generator. The flame produced by the hydrogen gas is colorless, and therefore does not produce any voltage at the photoelectric cell 13.

The atmoshpere being sampled is drawn from a container 16 by means of a tube 17 in communication with an inlet connection 18. Inlet 18 mixes the sample of atmosphere from container 16 with the hydrogen gas from inlet connection 15 prior to delivering the hydrogen gas to orifice 10. Therefore, the atmospheric sample from container 16 is burned at orifice 10 simultaneously with the hydrogen gas, and any contaminants in that sample will produce a colored flame of varying intensity in relation to the normally colorless hydrogen gas flame. These variations will be detected by the photocell 13 and will result in activation of circuits controlled by the detector or electometer 26 and controlled circuitry 27 used in rejecting or otherwise handling the containers 16 within which contaminants have been detected.

The apparatus shown in FIGURE 2 is substantially similar to that shown in FIGURE 1. However, in this instance, the inlet 20 through which the atmosphere sample is delivered to the enclosure 11 does not intersect the hydrogen gas inlet connection 21. Instead, inlet connection 20 is in open communication with the interior 12 of the enclosure 11 immediately adjacent to the flame at orifice 10. The atmospheric sample from container 22 is delivered through a tube 23 and inlet connection 20 for mixture with the hydrogen gas flame at orifice 10. Again, the presence of contaminants, particularly organic contaminants, will produce a colored flame of an intensity which will be detected by photoelectric cell 13 and used in proper detection and control circuits to reject or otherwise manipulate the contaminated container 22.

The enclosure 11 in each embodiment disclosed is further provided with an exhaust connection 24 operatively connected to a vacuum pump 25 to continuously draw atmosphere from within the enclosure 11 so that a positive changing of the atmosphere within enclosure 11 is insured. In this manner, the apparatus can be used to successively test containers, the atmosphere within enclosure 11 being purged between tests.

It is preferable to mount the photoelectric cell 13 slightly above the orifice 10 so that the incandescent ash which tends to collect at the orifice will not affect the sensing circuits. Assuming that the source of hydrogen gas produces gas of constant quality, a visible flame within the sealed opaque enclosure 11 can only be attributed to contaminants within the sample of atmosphere directed to the interior of enclosure 11.

It is to be understood that any suitable igniting device can be used to ignite the gases at orifice 10 and monitor the presence of the required flame. Again, reference can be made to my prior application, cited above.

The drawings provided are merely schematic, and directed only to the basic concepts of the sensing cell itself. It is to be understood that this cell can be used in many different physical combinations relating to differing types of testing devices for removing gaseous samples from containers or other areas and that the application of the cell is not to be restricted to any particular combination of other devices.

Having thus described my invention, I claim:

1. A contaminated air detector, comprising:
   a sealed enclosure;
   an orifice within said enclosure;
   a source of inflammable gas which produces a colorless flame operatively connected to supply gas to said orifice;
   atmospheric sampling means to direct a sample of atmosphere to said orifice;
   vacuum exhaust means in open communication with the interior of said enclosure;
   and photoelectric means within said enclosure adjacent said orifice to monitor the intensity of the flame produced thereby.

2. An apparatus as defined in claim 1 wherein the source of gas is a source of hydrogen gas to provide a normally colorless flame at said orifice.

3. An apparatus as defined in claim 1 wherein the atmospheric sampling means directs the sample to the enclosure interior adjacent to the orifice.

4. An apparatus as defined in claim 1 wherein the sample of atmosphere from said atmospheric sampling means is introduced into the gas from said source prior to reaching the orifice.

5. An apparatus as defined in claim 1 wherein said atmospheric sampling means comprises a device for delivering a sample of atmosphere from the interior of a bottle.

6. An apparatus as defined in claim 1 wherein the photoelectric means includes a photocell in one side of the sealed enclosure and a mirror on the opposite side of the sealed enclosure.

References Cited

UNITED STATES PATENTS

| | | | |
|---|---|---|---|
| 892,241 | 6/1908 | Freise | 250—218 X |
| 2,664,779 | 1/1954 | White | 73—23 X |
| 2,977,479 | 3/1961 | Laver | 250—218 |
| 3,298,785 | 1/1967 | Reul | 88—14 |

WALTER STOLWEIN, Primary Examiner.

U.S. Cl. X.R.

73—23